US006726430B1

(12) United States Patent
Donelson

(10) Patent No.: US 6,726,430 B1
(45) Date of Patent: Apr. 27, 2004

(54) GRAIN SPREADER

(76) Inventor: Harlan J. Donelson, 3705 Windmill La., Plano, TX (US) 75074

( * ) Notice: Subject to any disclaimer, the term of this patent is extended or adjusted under 35 U.S.C. 154(b) by 0 days.

(21) Appl. No.: 10/361,434

(22) Filed: Feb. 10, 2003

(51) Int. Cl.$^7$ .............................................. B65G 65/00
(52) U.S. Cl. ...................... 414/301; 414/294; 414/295; 414/297; 414/298; 414/300
(58) Field of Search ................................ 414/301, 294, 414/295, 297, 298, 300

(56) References Cited

U.S. PATENT DOCUMENTS

| 3,794,386 A | * | 2/1974 | Hite ............................ 302/60 |
| 4,033,466 A | * | 7/1977 | Easton .................. 214/17 CB |
| 4,318,511 A | * | 3/1982 | Clark .......................... 239/684 |
| 4,437,613 A | * | 3/1984 | Olson .......................... 239/688 |
| 4,564,328 A | * | 1/1986 | Loutaty et al. ............. 414/301 |
| 5,019,242 A |   | 5/1991 | Donelson |
| 5,020,701 A |   | 6/1991 | Donelson |
| 5,393,189 A | * | 2/1995 | Berquist ..................... 414/301 |

* cited by examiner

*Primary Examiner*—Christopher P. Ellis
*Assistant Examiner*—Rashmi Sharma

(57) ABSTRACT

A grain loading and spreading device has a tapered housing with a grain flow restrictor valve assembly that will cause a uniform discharge of grain around the perimeter of a lower discharge opening. The valve assembly has upper and lower cam elements on a downwardly extending motor drive shaft. The lower cam element is fixed to the shaft, and the upper cam element is not fixed to the shaft. The cam elements are releasably engaged with each other. A horizontal plate with vertical baffles on the upper surface is secured to the upper cam element. When grain flow restricts the rotation of the plate and baffles, the upper cam element will be moved upwardly with respect to the lower cam element, to enlarge the width of the grain passageway between the perimeters of the plate and the side wall of the tapered housing.

5 Claims, 8 Drawing Sheets

GRAIN SPREADER

BACKGROUND OF THE INVENTION

Harvested grain, particularly shelled corn, is typically placed in circular steel bins for drying or storage. It is very important that the grain be deposited in the bin so that the top surface of deposited grain be in a level horizontal plane to insure uniform drying and other conditions, including balancing the load on the bin structure.

The grain is typically moved by a suitable conveyor from grain wagons and the like, such as by an auger conveyor, to the apex of the bin roof where it is deposited into an inlet opening. Existing grain spreaders are mounted in the inlet opening to intercept the incoming stream of grain. A rotatable plate on the grain spreader thereupon scatters the grain outwardly and downwardly to uniformly distribute the grain within the bin.

Existing grain spreaders often have to be adjusted from time to time to compensate for variations in moisture in the grain, rate of flow in the incoming stream of grain, and other factors that may affect the uniformity of grain flow. None of these spreaders have the ability to automatically make the necessary adjustments while the spreader is in operation, and this is particularly a problem for the variations cannot ordinarily be ascertained as soon as they occur.

Therefore, it is a principal object of this invention to provide a grain spreader that will interrupt the flow of incoming grain, and thereupon will deliver a uniform mass of grain to the grain spreading mechanism.

A further object of this invention is to provide a grain spreader that will automatically control the incoming stream of grain to compensate for variations in the speed and volume of the incoming grain.

These and other objects will be apparent to those skilled in the art.

SUMMARY OF THE INVENTION

A grain spreader has a housing with open top and bottom portions, and a side wall that tapers inwardly and downwardly from the top portion. A spinner plate is located in the upper portion to intercept the inflowing stream of grain and to create a shower of grain to the outer portions of the housing for gravity movement of the grain towards the bottom portion of the housing. A conventional grain spreading mechanism is located below the housing.

A motor with a downwardly extending drive shaft is located in the upper portion of the housing. A valve assembly is connected to the drive shaft, and is comprised of upper and lower cam elements which have engaged inclined cam surfaces thereon. The lower cam element is secured to the drive shaft.

A horizontal plate is secured to the top of the upper cam element and has one or more upstanding baffles thereon. The plate has a center aperture to receive the shaft and can freely rotate around the drive shaft as permitted by the rotational ability of the lower cam element.

The cam elements are normally engaged as their cam surfaces are superimposed upon each other. A space exists between the perimeter of the plate and the tapered side wall to determine the width of the grain passageway when the plate is in its lowered position.

However, if and when the flow of grain increases and begins to substantially encompass the baffles on the top of the plate, the grain interferes with the rotation of the valve assembly insofar as the upper cam element is concerned, and the upper cam element, the plate, and the baffles cannot continue to rotate in coordination with the drive shaft and the lower cam element. As a result, the cam surfaces of the two cam elements separate, and are connected only with portions of the peripheries of the cam surfaces, wherein the second or upper cam element is forced upwardly. Its upper movement is limited by a stop element on the shaft, and the cam elements never completely disengage each other. The raising of the plate with the upper cam element gradually increases the lateral distance between the perimeter of the plate and the tapered side wall, which increases the width of the grain passageway, thus allowing more grain to move through the system to accommodate the increased flow of grain through the system.

The plate will rise to its maximum condition, or positions approaching this level, automatically determined by the increased amount of grain flow. This happens automatically without any exterior adjustment. All the while, the grain passageways deliver a full, uniform amount of grain to the lower open bottom of the housing, for distribution by the spreading assembly.

DESCRIPTION OF THE PREFERRED EMBODIMENT

Figure 1:
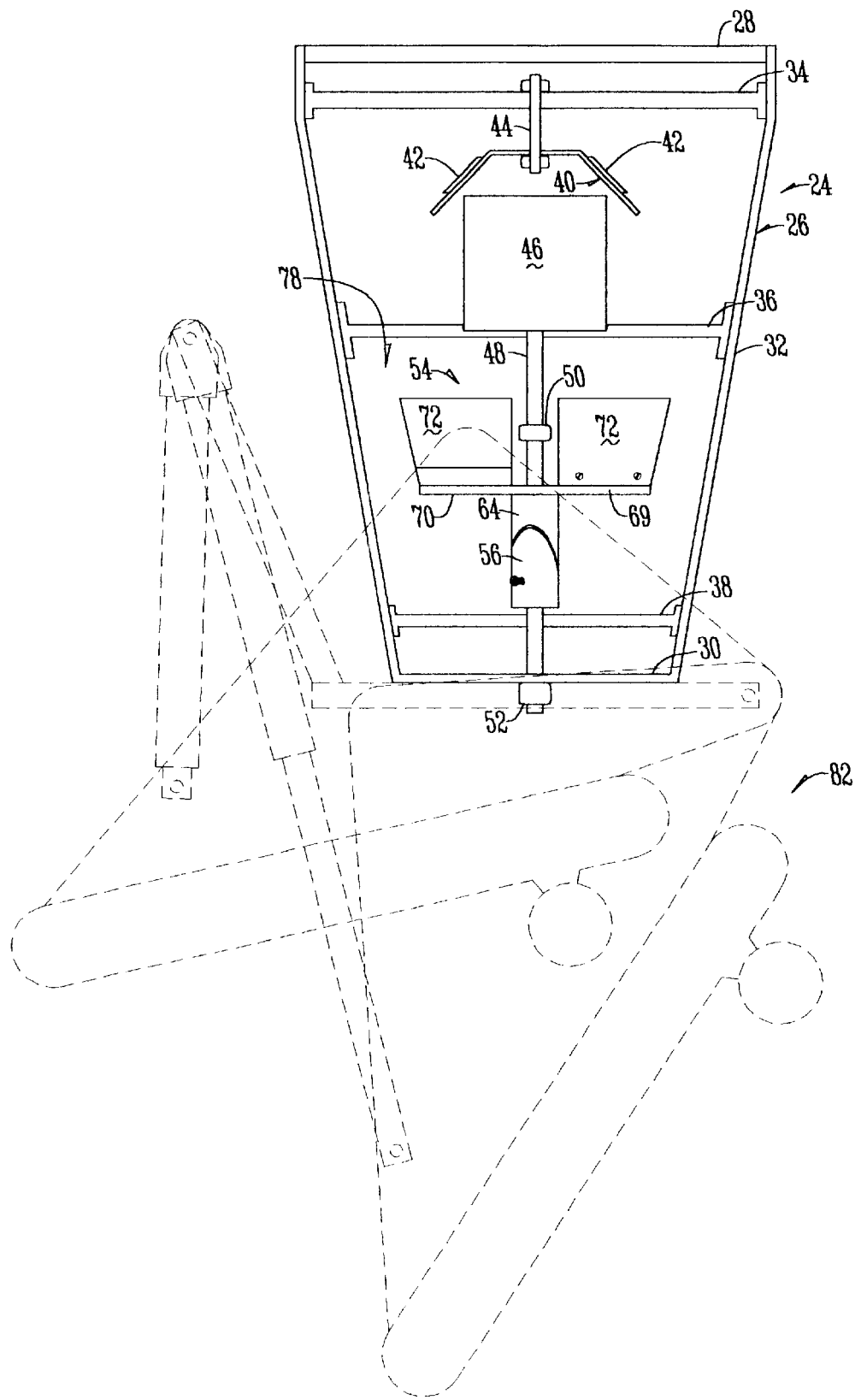
FIG. 1 is a large scale sectional view of the device of this invention with its valve assembly in a position of a low rate of grain flow.
Figure 1A:
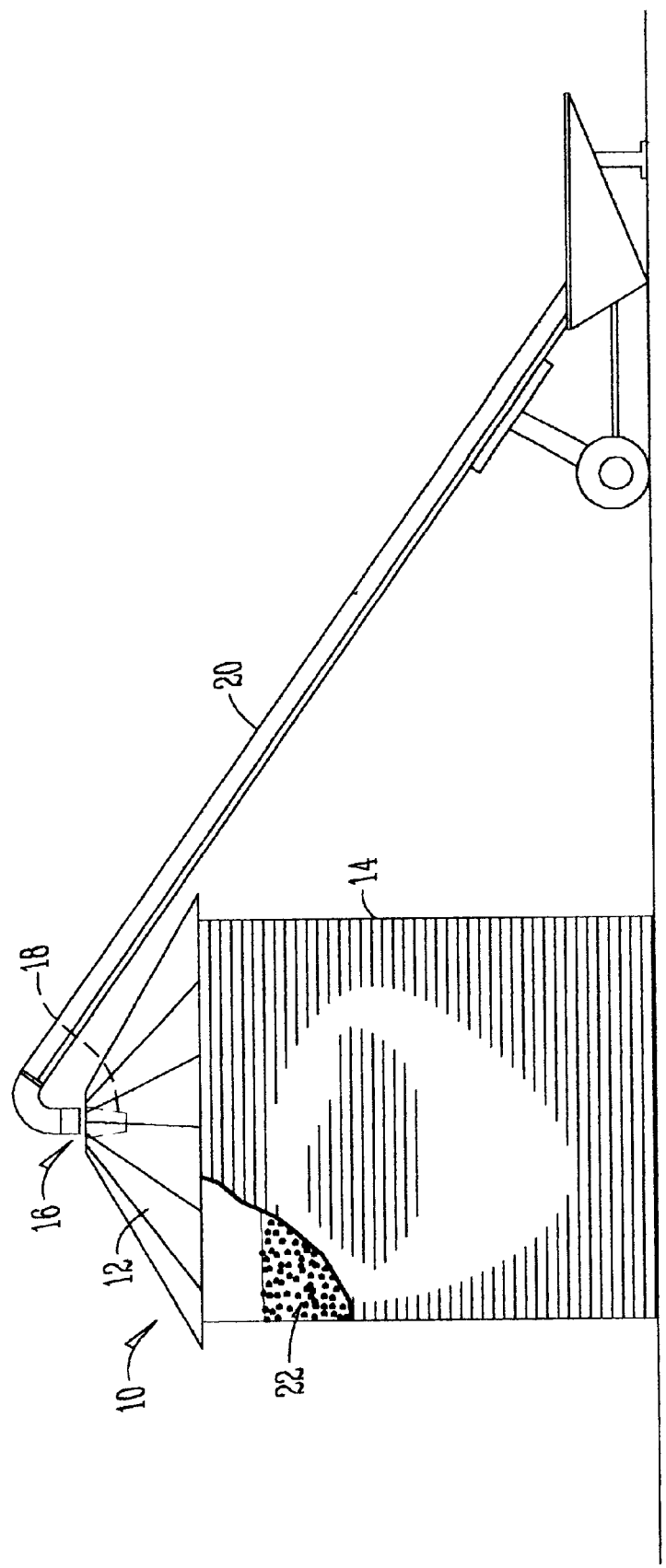
FIG. 1A is a reduced scale elevational view showing a typical grain bin filling operation.

With reference to FIG. 1A, a typical grain bin 10 has an inclined roof 12, and cylindrical side wall 14. The roof 12 has a center opening 16 in which a typical grain spreader 18 can be suspended. A conventional supply auger 20 is used to convey grain 22 to the opening 16.

Figure 2:
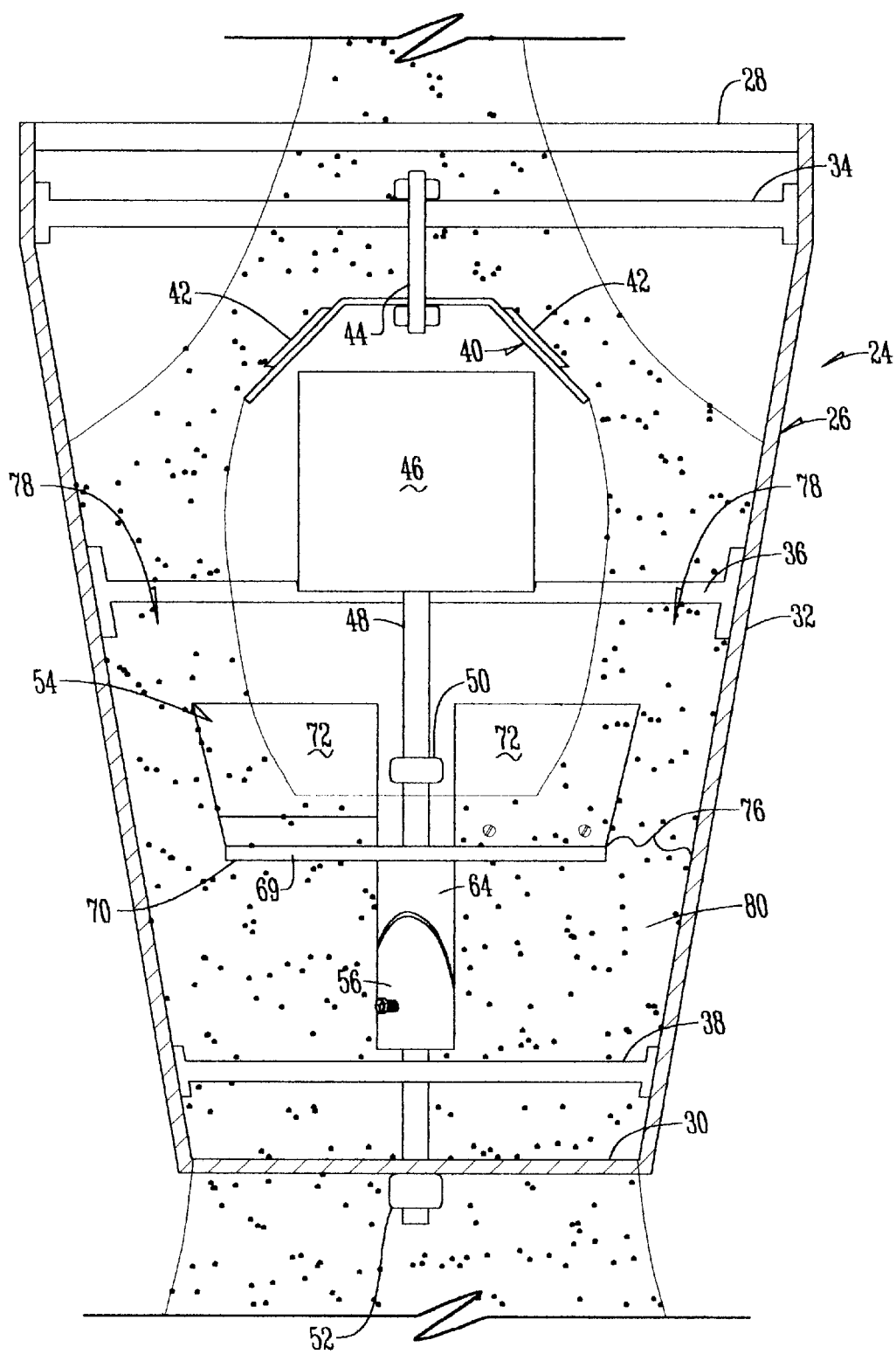
FIG. 2 is a sectional view similar to FIG. 1 showing grain flowing therethrough at a low rate of grain flow.
Figure 2A:
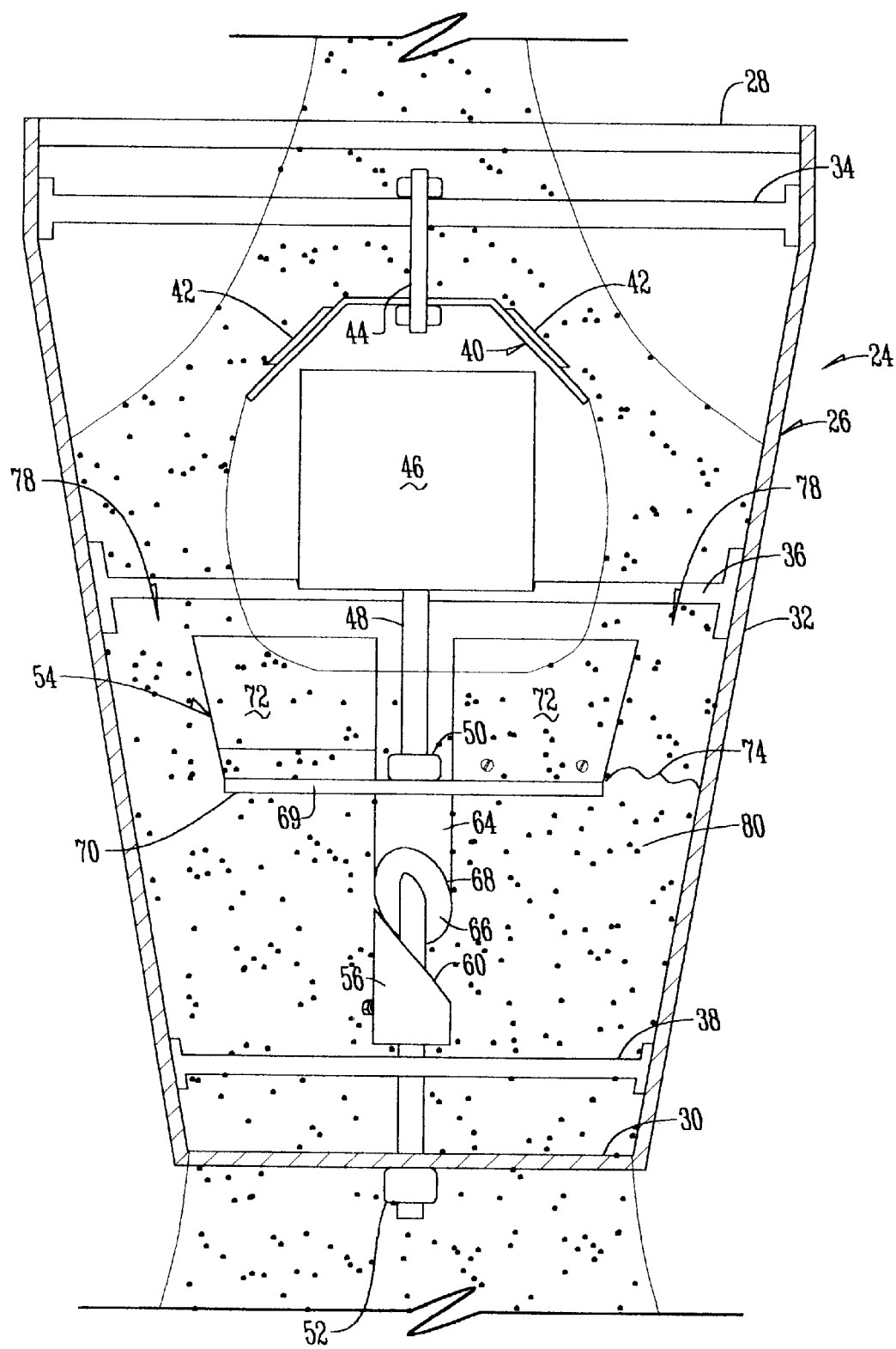
FIG. 2A is a partial sectional view similar to FIG. 2 but shows the valve assembly in the maximum flow position.
Figure 3:
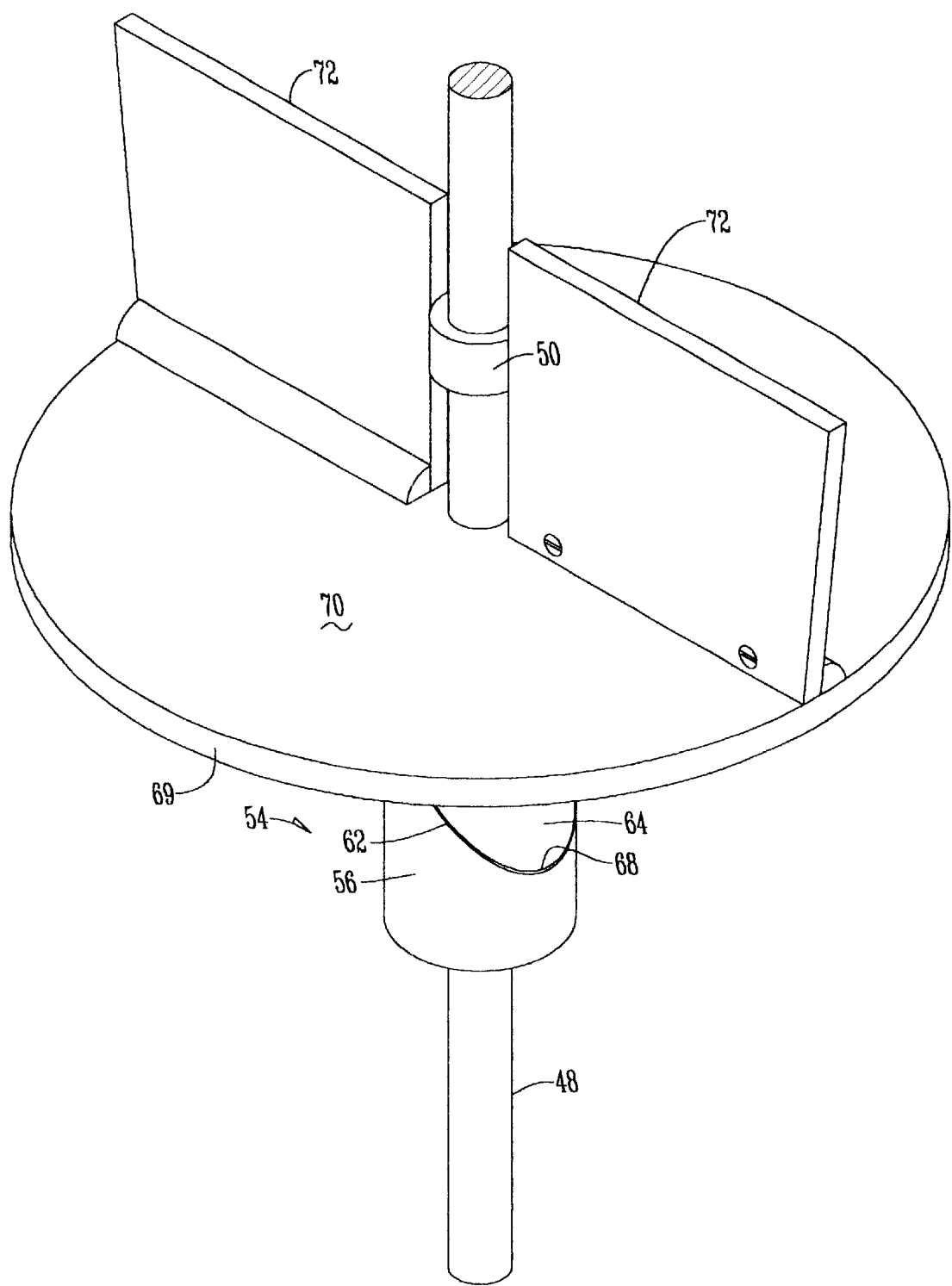
FIG. 3 is a perspective view of the valve assembly.

The grain leveling and spreader unit 24 of this invention is shown in FIGS. 1, 2, and 2A. The unit 24 includes a housing 26 with an open upper end 28 and an open lower end 30. The side wall 32 is tapered downwardly and inwardly. Conventional horizontal support brackets 34, 36 and 38 extend across the interior of the housing 26 at the upper, middle and lower elevations of the housing 26. A conventional spinner deflector 40 is mounted within the upper portion of the housing 26. Angled bars 42 on the top surface thereof cause the spinner deflector 40 to rotate on support shaft 44 when a stream of grain falls downwardly on the sloping upper surface thereof.

A motor 46 with a downwardly extending drive shaft 48 is mounted on support bracket 36. A bushing and nut assembly 50 is mounted on the upper end of drive shaft 48 and a bushing and stop member 52 is mounted on the lower end. A controller (not shown) can be used to control the rotational speed and direction of down shaft 48.

Figure 4:
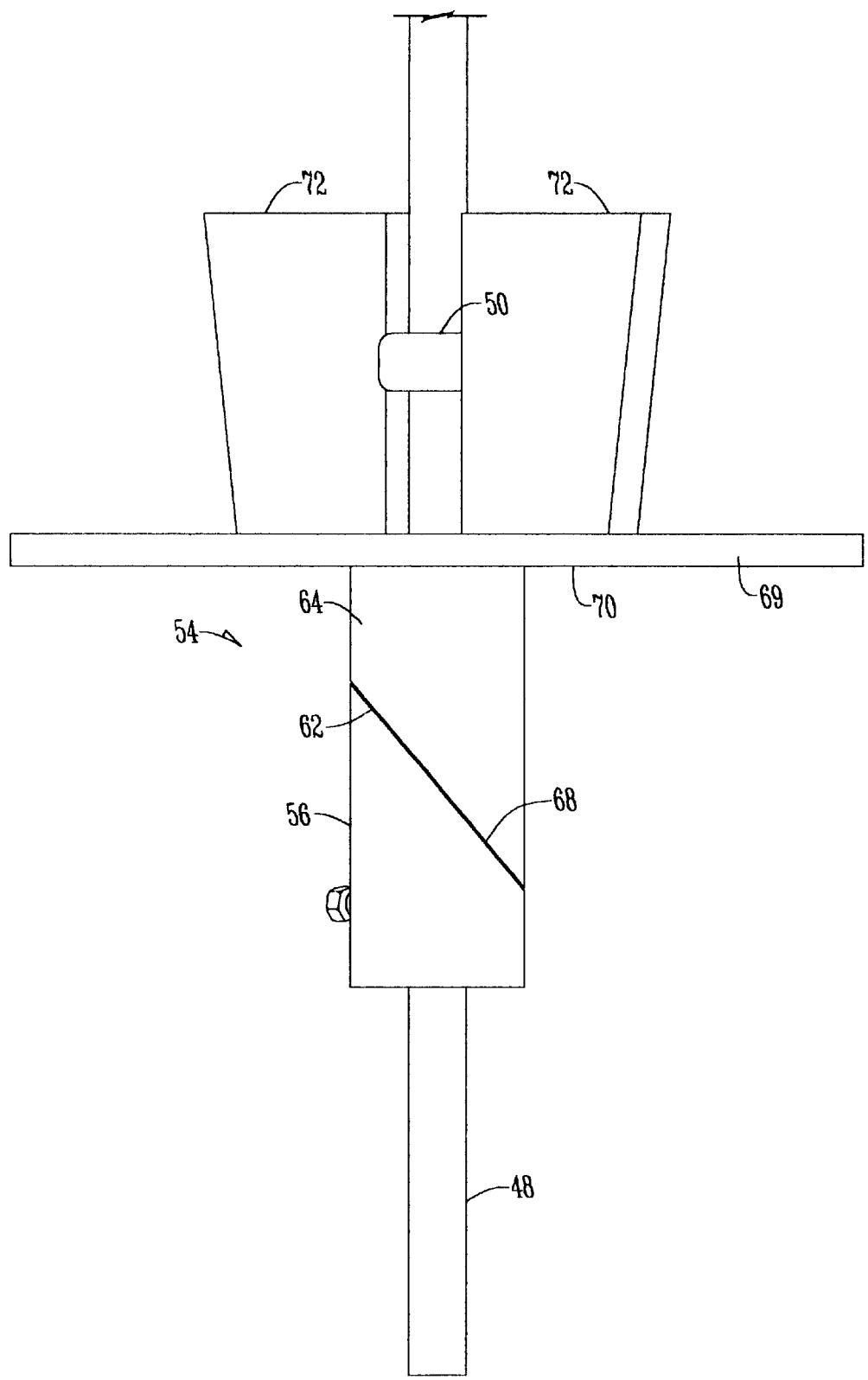
FIGS. 4, 5 and 6 show the cam elements and cam surfaces of the valve assembly in conditions of low, medium and maximum flow, respectively.

A valve assembly 54 is positioned on the drive shaft 48. The assembly 54 includes a first or bottom cam element 56 rigidly secured to the lower end of shaft 48 just above bushing 52 by set screws or the like, and has a flat inclined cam surface 60 with a perimeter edge. A second cam element 64 has a second flat inclined cam surface 66 with a perimeter edge 68. In conditions of decreased flow of grain, the two cam surfaces 60 and 66 are in coextensive superimposed overlapping condition (FIG. 4).

A horizontal circular plate 70 is secured to the top of the upper or second cam element by screws or the like, and has a center opening that loosely encircles the drive shaft 48. The upper cam element is slidably and rotatably mounted on drive shaft 48 as will be discussed hereafter. At least one baffle plate 72 is secured to the top of plate 70 in substantially radial and upstanding positions.

It should be noted that the perimeter edge 69 of plate 70 is horizontally separated from tapered sidewall 32 a distance 74 (FIG. 2A) when the upper cam element is in its upper position, and is separated a shorter distance 76 from the side wall (FIG. 2) when in a lower position. The grain passageway along the inner surface of housing 26 is designated by the numeral 78, and varies in width at the perimeter 69 of plate 70 depending on whether the plate and upper cam element 64 are in their upper or lower positions.

In operation, the motor 46 is actuated to rotate shaft 48 and valve assembly 54. The grain is deposited in the upper end of the unit 24 by the supply auger 20 and is uniformly spread into a stream of grain 80 sliding off of the perimeter of rotating spinner deflector 40. The stream of grain 80 then moves downwardly in grain passageway 78 past the motor 46 and towards the lower end 30 of the housing 26.

Figure 5:
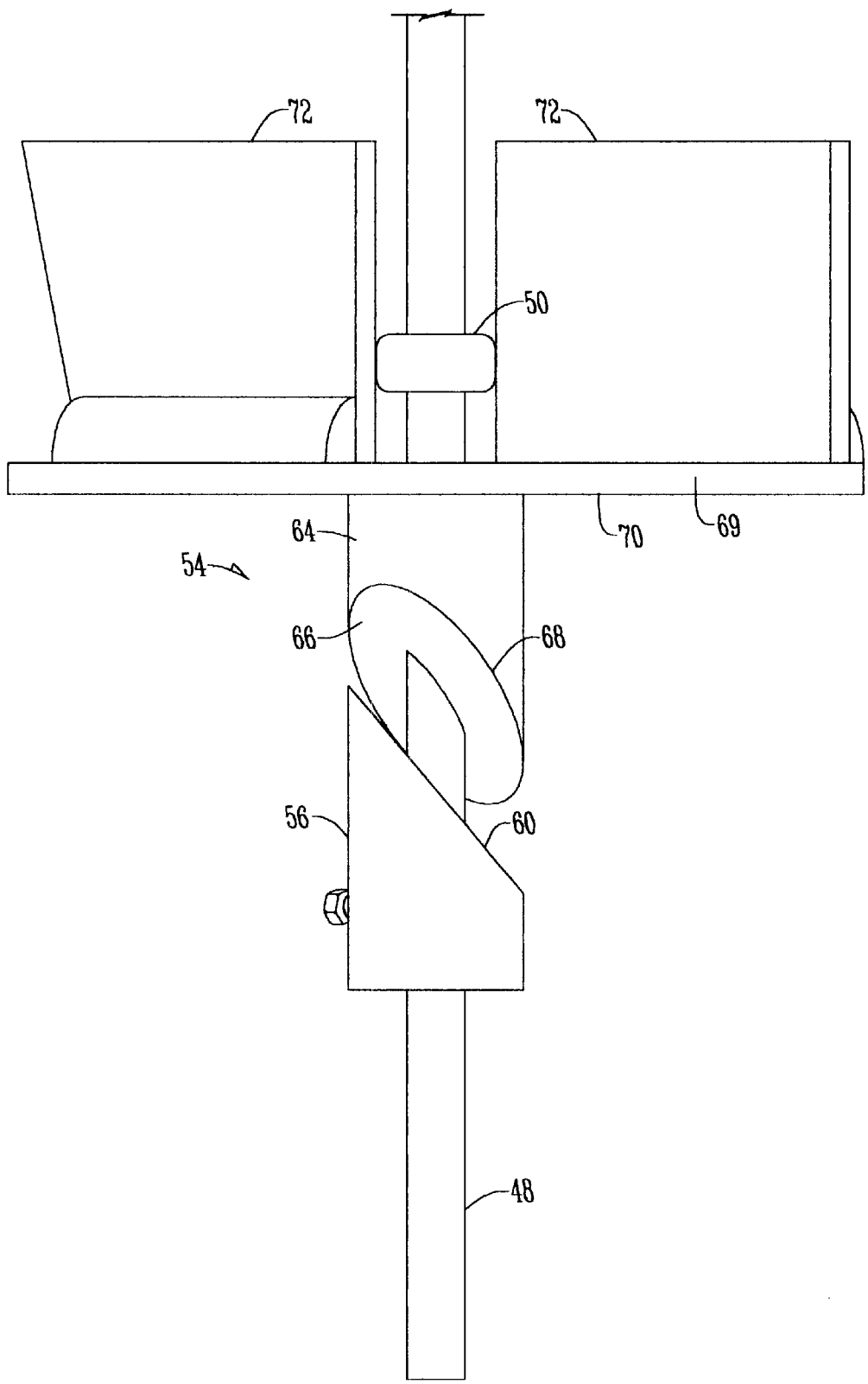
Figure 6:
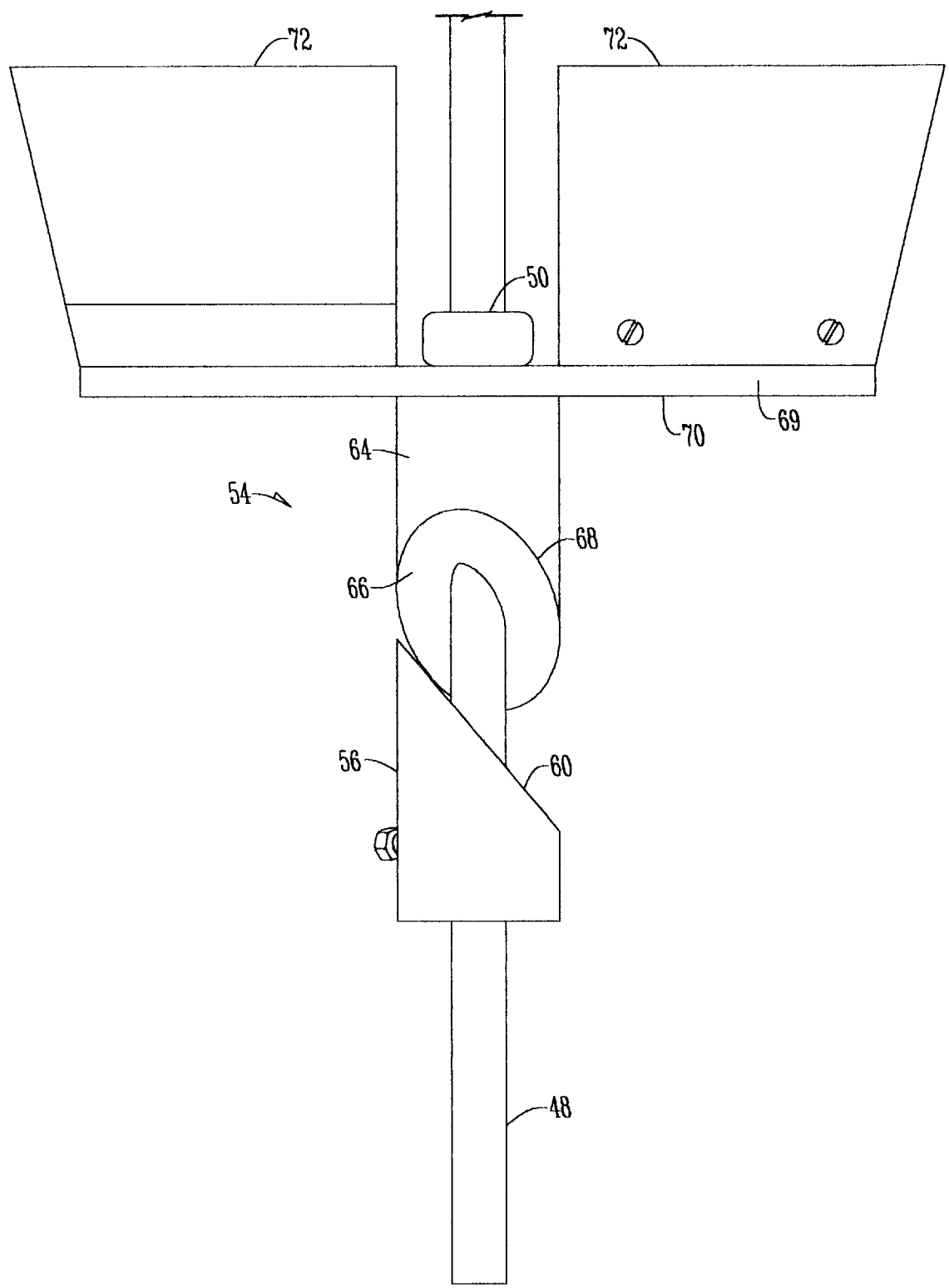

The valve assembly 54 serves as a flow control restriction to the downward movement of grain. Initially, the weight of plate 70 keeps the upper cam element 64 in full contact with the lower cam element 56 as shown in FIGS. 2 and 4. The width of the grain passageway 78 is reduced to the narrower width 76 shown in FIG. 2. However, if the flow of grain begins to increase from the flow indicated in FIG. 2 to the level of FIG. 2A, the grain begins to fill in around baffles 72. This grain offers resistance to the rotation of plate 70 and the baffles which are rotating with shaft 48 and the lower cam element 56 just prior to this time. As the rotation of plate 70 and baffles 72 decreases, the upper cam element 64 begins to slide upwardly on shaft 48, and the engagement of the cam surfaces moves progressively along the periphery 62 and 68 of the cam surfaces 60 and 66 as shown in FIGS. 5 and 6. The upper cam element 64 can rotate approximately 180°. The upper movement of the upper cam element 64 is limited by stop member 50. Stop member 50 is rigidly secured to drive shaft 48 and engages the top of plate 70. This prevents baffles 72 from rising to a level wherein they engage support bracket 36. The passageway 78 increases to width 74 (FIG. 2A) to provide increased grain flow. The plate 70 will be raised upwardly until the flow volume of the grain reaches equilibrium of the capacity of the auger 20, thus providing a uniform flow of grain around the perimeter of the open lower end 30.

The numeral 82 (FIG. 1) designates a conventional grain spreading assembly for spreading the grain discharged uniformly from the lower end 30. The uniform flow of grain from the perimeter of opening 30 will insure the uniform spreading of grain by assembly 82.

Thus, it is seen that the device will accomplish at least all of its stated objectives.

What is claimed is:

1. A grain leveling and spreader device for spreading and leveling grain that is being delivered into an upper portion of a grain repository compartment, comprising, a grain receptacle housing for mounting in an upper portion of a grain repository compartment, and having a top portion for receiving grain, a bottom portion, and a side wall which is circular in cross section, power means associated with the device for rotating a vertical drive shaft extending downwardly with the compartment, a valve assembly connected to the drive shaft, the valve assembly comprising a first cam element fixed to the shaft and having an inclined flat first cam surface, a second cam element slidably mounted on the drive shaft above the first cam element and having an inclined flat second cam surface which mates with and rests coextensively on the first cam surface when in a lowermost position, a horizontal plate rigidly mounted on a top of the second cam element and being rotatable with respect to the drive shaft, at least one upstanding baffle on the plate, the first and second cam surfaces being disposed together in such a manner that grain pressure exerted against the baffle to inhibit rotation of the plate and the second cam element will cause the second cam element to slide upwardly on the drive shaft and will cause partial rotation of the second cam element as the second cam element slides upwardly on the drive shaft through interaction between perimeter edges of the cam surfaces, a stop element on the shaft above the valve assembly to limit the upper movement of the second cam element and to maintain the engagement of the perimeter of the first and second cam surfaces, the valve assembly being in spaced relationship with the side wall of the housing to create a grain passage around the valve assembly defined by the space between the sidewall and an outer perimeter of the plate, the shape of the side wall being such that the horizontal width of the space between the side wall and the outer perimeter of the plate increases when the second cam element moves upwardly on the drive shaft, means associated with the bottom of the compartment for gathering grain passing the valve assembly and spreading the same within a grain repository compartment.

2. The device of claim 1 wherein a controller is connected to the power means to permit regulation of the rotation of the drive shaft.

3. The device of claim 2 wherein the power means is a motor, and wherein the controller controls the direction of the drive shaft.

4. The device of claim 1 wherein the first and second cam surfaces are oval-shaped and have perimeter edges, and wherein the perimeter edges of the cam surfaces are in rotational operative engagement as the second cam element slides upwardly on the drive shaft.

5. The device of claim 1 wherein the side wall of the housing tapers downwardly and inwardly.

\* \* \* \* \*